United States Patent Office 3,051,756
Patented Aug. 28, 1962

3,051,756
MONOMERS, POLYMERS, AND METHODS FOR MAKING THE SAME
Thurman E. Gier, Wilmington, Del., assignor to E. I. du Pont de Nemours and Company, Wilmington, Del., a corporation of Delaware
No Drawing. Filed Apr. 22, 1960, Ser. No. 23,882
5 Claims. (Cl. 260—606.5)

This invention relates to certain new high energy organic derivatives of trivalent phosphorus and to processes for their preparation.

Although the field of inorganic-organic chemistry has yielded many technically important products, the chemistry of the organic derivatives of phosphorus, particularly the derivatives of trivalent phosphorus, has received little attention.

This invention more specifically relates to certain new monomeric and polymeric compounds of phosphorus, carbon, and hydrogen and to respective methods for their preparation.

The monomeric product of this invention is termed methinophosphide, and is a chemical compound consisting of carbon, phosphorus, and hydrogen corresponding to the formula HCP. Monomeric methinophosphide is characterized by having (1) a triple point of $-124°$ C.$\pm 2°$ C. (2) narrow infrared adsorption bands at liquid nitrogen temperatures (about $-196°$ C.) at $3.15\mu$, $7.4\mu$, and $7.9\mu$, and a broad infrared adsorption band centering near $14.7\mu$, and (3) a mass spectrum giving values for $m/e$ ions corresponding respectively to 44 for HCP$^+$, 43 for CP$^+$, 31 for P$^+$, 22 for HCP$^{++}$, 13 for CH$^+$ and 12 for C$^+$. These values for the $m/e$ ions were obtained on a Consolidated Electrodynamic Corp. Model 21–104–C mass spectrometer at ambient temperature. The solid form of monomeric methinophosphide melts at $-124°$ C.$\pm 2°$ C. under its own vapor pressure. At $-130°$ C. the solid possesses a vapor pressure of 10 to 15 mm. Hg and may be sublimed at this temperature, or lower, i.e., ca. $-150°$ C. Below $-150°$ C. the solid is stable.

The gaseous form of monomeric methinophosphide is stable at temperatures below $-150°$ C. and, when diluted with 99.5 weight percent of helium, it is substantially completely stable for at least 30 minutes at 25° C. at atmospheric pressure.

Mehinophosphide when initially prepared is highly pyrophoric and inflames upon exposure to air or oxygen. It polymerizes under its own vapor pressure at $-130°$ C. at a rate such that within five minutes after the monomer is exposed to such temperatures, measurable quantities of solid polymer are visible.

The polymeric product of this invention is termed polymeric methinophosphide and corresponds grossly to the empirical formula (HCP)$_n$, where $n$ is an integer greater than 3. The upper limit of $n$ is unknown presently but is believed to be in excess of at least 1000.

Polymeric methinophosphide is a black nonvoltaile solid. It is pyrophoric when initially prepared but loses this pyrophoricity after about three weeks' storage in an oxygen-free atmosphere at atmospheric pressures (circa 760 mm. Hg) and room temperatures (circa 25° C.).

Monomeric methinophosphide is conveniently prepared by passing phosphine at a pressure below about 300 mm. Hg rapidly through a zone of high heat, say, at least 500° C. to perhaps below about 3000° C. and thereafter rapidly quenching the product gases in a trap maintained at temperatures not above about $-150°$ C. Specifically, a convenient method is to pass phosphine at a pressure below about 300 mm. Hg through a rotating, low intensity carbon arc of the type disclosed in U.S. Patent 2,925,625 when such arc is operated in the range of 25 to 100 amperes. The product gases are immediately passed into a liquid nitrogen trap maintained at $-196°$ C.

The monomeric product which forms in the trap is a white solid which can be stored at $-196°$ C. under an inert atmosphere or under vacuum. This material can be purified by passing it through one or more liquid nitrogen traps.

When a container holding the white solid monomeric product is evacuated, sealed, and gradually warmed under its own vapor pressure, polymerization is observed with the formation of a black solid as the temperature approaches $-130°$ C. As warming continues, one observes a triple point at $-124°$ C.$\pm 2°$ C. At this point gas, liquid, and solid coexist at equilibrium.

I prepare the polymer from purified monomer by allowing the solid monomeric product to warm to temperatures not below $-130°$ C. under autogenous pressures. As such warming takes place, auto-polymerization occurs. The formation of the polymer is readily determined because it forms as a black solid.

These monomeric and polymeric products have a number of interesting, useful, and unusual properties. The monomeric product and freshly made polymeric product are pyrophoric. As a gas the monomeric product displays extreme pyrophoricity. For example, the gas when diluted with a second relatively inert gas (as regards the monomer), spontaneously ignites upon exposure to air even when the monomer is present in very small quantities, say, less than 1%. For example, a 90% mixture of acetylene and the monomeric product of this invention when exposed to air under room temperatures and pressures spontaneously ignites and sustains combustion. This property of pyrophoricity, of course, has immediate practical values—for example, as a means for preventing flameouts, as in jet engines.

The extremely pyrophoric character of this material is demonstrated by the fact that even when one attempts to remove the monomeric product as a gas from helium by passing a mixture of helium and the monomeric product successively through two liquid nitrogen traps, a sufficient quantity of the monomeric product remains to cause flaming upon further contact of the helium with air. Calculations show that the amount of monomeric material present under such circumstances is less than 0.1%.

As noted above, the polymeric material when freshly prepared is also pyrophoric. Freshly prepared polymer is useful, like the monomer, as a flameout device. However, after three weeks the polymer appears to lose its pyrophoricity.

Both the pyrophoric and non-pyrophoric forms of methinophosphide (monomeric and polymeric) are hypergolic in contact with concentrated nitric acid. Thus, the products of this invention are useful as components of high energy fuels.

Polymeric methinophosphide is valuable as an agent for slowly releasing phosphorus and hence, for example, is useful as a fertilizer.

The invention is further illustrated by reference to the following examples:

Example I

A rotating arc reactor consisting of a $\frac{3}{16}''$ diameter graphite cathode and a graphite anode cup, $\frac{1}{2}''$ in inside diameter, is enclosed in a water-cooled copper shell capable of being evacuated. The arc is drawn between the cathode tip and the rim of the cup and rotated at a high speed by a magnetic field. Phosphine at a pressure of 40 mm. Hg and at a rate of 160 cc./min. (S.T.P.) is passed through the arc, operating at 25 amperes. The gases emerging from the arc reactor are quenched immediately by passage through a trap cooled at $-196°$ C. This trap permits hydrogen, formed in the reaction, to be pumped off but retains all other products. After 30 minutes' operation, the contents of the trap are transferred at low pressure to a cooled, evacuated cylinder. Mass spectral analysis indicates the following material:

Acetylene _____ 63–65%; $C_2H_6$ and $C_2H_4$ (trace amounts).
Methinophosphide _____ 18–19%.
$CO_2$ _____ 8.5–9%.
$PH_3$ _____ 1–2%.

After the mass spectral analysis, the cylinder is warmed and found to contain 0.242 g. of product.

*Example II*

Three grams of red phosphorus are intimately mixed with an equal weight of graphite and packed in the anode cup of the rotating arc reactor of Example I. The phosphorus is vaporized and passed through the arc, operating at 100 amperes, along with hydrogen at a rate of 50 cc./min. (S.P.T.), under about 5 mm. Hg pressure. After ½ hour of operation, the product gases are collected as in Example I and analyzed by gas chromatography.

Acetylene=82.4%
HCP=11.2%
$PH_3$=2.6%

The yield of methinophosphide (HCP) is calculated to correspond to 0.53%, based on the phosphorus charged to the arc. Purification is accomplished by passing a mixture of helium and crude vaporized methinophosphide into a 6' x ¾" column packed with silica gel containing 10% by weight of ethyl N,N-dimethyloxalamide. The column is operated at room temperature with helium flowing at a rate of 400 cc./min., which permits gas phase elution of relatively pure methinophosphide. Analysis of the methinophosphide thus made, by mass spectroscopy, gave:

Methinophosphide=93.4%
$C_2H_2$=1.7%
$C_2H_4$=0.9%
$N_2$, air=3.7%

When allowed to warm to −130° C., methinophosphide polymerizes to a brown-black solid. The infrared absorption spectrum of the monomer at −196° C. contains bands at 3.15μ (acetylenic CH) at 7.4μ and 7.9μ and 1 broad band centering near 14.7μ. The monomer has a mass spectrum (m/e ions) at 44, 43, 31, 22, 13, and 12.

Methinophosphide, prepared as above, reacts with hydrogen chloride at −110° C. The product obtained is methyldichlorophosphide, as identified by mass spectrography. Methyldichlorophosphide is a known compound which finds utility as an intermediate for the preparation of heat-resistant polymers, as disclosed and claimed in U.S. Patents 2,071,079 and 2,071,080. Methyldichlorophosphide is also useful for preparing thermoplastic by reaction with rubber and a modifying agent such as a phenol, styrene, hydrogenated cotton seed oil, etc., as disclosed and claimed in U.S. Patent 2,387,521.

As illustrated, methinophosphide is produced directly by passing phosphine into a carbon arc and this constitutes a practical preferred embodiment of the invention.

In place of using preformed phosphine, a mixture of hydrogen and vaporized phosphorus can be passed into the carbon arc.

To obtain monomeric methinophosphide, it is essential that the product gases be quenched quickly to −196° C. and this is conveniently done by passing the product gases under reduced pressure into a receptacle cooled in liquid nitrogen.

The reaction is usually carried out under reduced pressures, i.e., at 5 to 300 mm., because this provides a practical and convenient means for quickly transferring the product gases to the quenching zone held at −196° C.

Methinophosphide is a very reactive material, and when allowed to warm to −130° C., it readily polymerizes to a pyrophoric solid.

The product gases from the carbon arc contain, in addition to methinophosphide, hydrogen and acetylene and small amounts of ethylene, ethane, and carbon dioxide. The methinophosphide is conveniently separated from the accompanying reaction products by passage through a silica gel/esteramide column maintained at 25° C., using helium as a carrier gas.

The present process involves a heating step and a quick quenching step. With any given operation, the efficiency of the quenching step will be primarily a function of the velocity with which the product gases are removed from the reaction zone. This is a function of the feed rate and the pressure. Increasing the feed rate and decreasing the pressure results in more efficient quenching. Since better results are obtained operating at pressures below atmospheric, which permit lower feed rates, this mode of operation is usually preferred. The absolute pressure can be as low as can be obtained practically, e.g., 1 to 2 mm. or less. Preferably the absolute pressure is maintained below 300 mm.

In the process of this invention graphite electrodes are preferred. The activity or state of subdivision of the carbon is of no consequence, but it must, of course, possess sufficient conductivity. The carbon need not be rigorously pure and it may, for example, contain the normal amount of ash, e.g., 0.5 to 4% by weight.

Copolymers can be made by permitting methinophosphide to polymerize in the presence of other polymerizable monomers.

This invention provides a practical and simple method for preparing methinophosphide and its polymers.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A polymeric solid product corresponding grossly to an empirical formula $(HCP)_n$ wherein $n$ is an integer greater than 3, said product, though pyrophoric as initially formed, becoming non-pyrophoric after three weeks' storage in an oxygen-free atmosphere at atmospheric pressures and room temperatures.

2. A process for preparing monomeric methinophosphide comprising the steps of passing phosphine through a rotating low-intensity carbon arc at a pressure below 300 mm. Hg and then passing the product gases into a trap maintained at −196° C.

3. A process for preparing the compound of claim 1 comprising warming solid monomeric methinophosphide to at least −130° C. under autogenous pressures.

4. In a process for preparing monomeric methinophosphide, the steps of passing phosphine at a pressure below about 300 mm. Hg through a rotating low-intensity carbon arc maintained at a temperature of at least 500° C. and thereafter immediately passing the product gases into a trap maintained at a temperature not above −150° C.

5. A process for preparing monomeric methinophosphide comprising the steps of passing a mixture of hydrogen and vaporized phosphorus through a rotating low-intensity carbon arc at a pressure below 300 mm. Hg and then rapidly quenching the product gases to a temperature not above −150° C.

References Cited in the file of this patent

Shober et al.: Am. Chem. Jour. 16, 229–32 (1894).
Albers: Ger. Chem. Soc. Meeting (1950).